March 8, 1938. H. D. GEYER 2,110,482
FREEZING TRAY
Filed Jan. 16, 1936
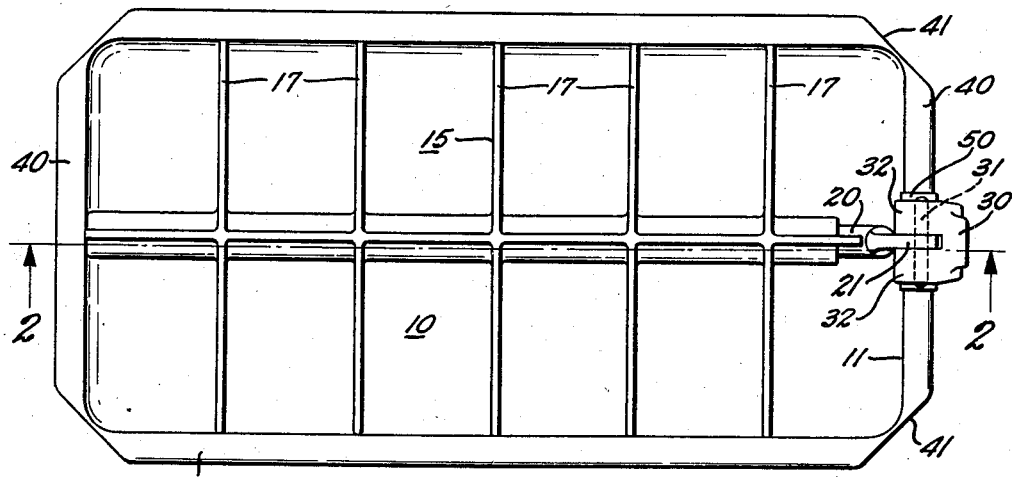
Fig. 1.
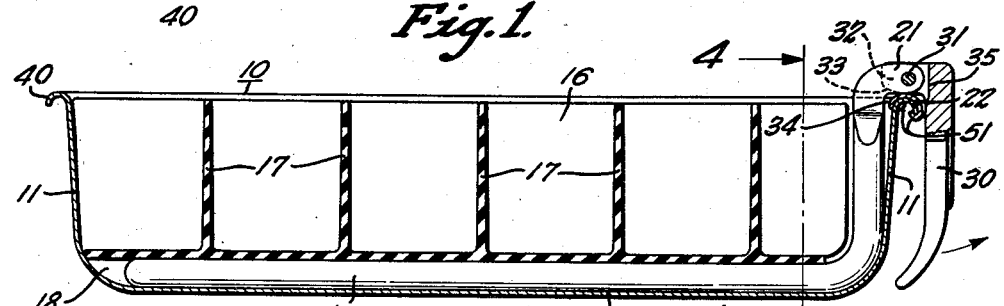
Fig. 2.
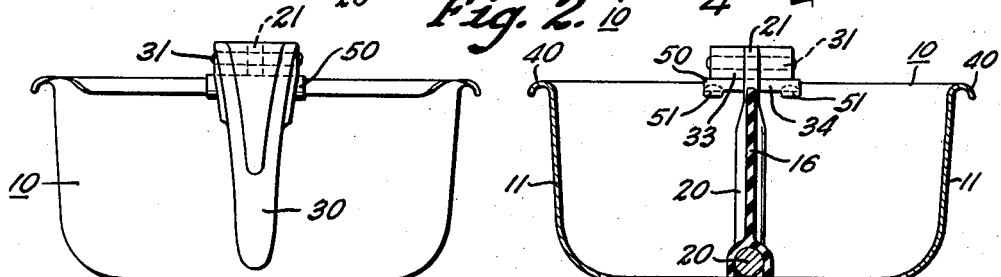
Fig. 3. Fig. 4.
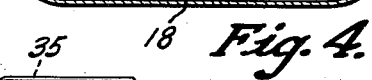
Fig. 5.
INVENTOR
Harvey D. Geyer
BY
Spencer Hardman & Fehr
HIS ATTORNEYS

Patented Mar. 8, 1938

2,110,482

UNITED STATES PATENT OFFICE 2,110,482

FREEZING TRAY

Harvey D. Geyer, Dayton, Ohio, assignor to General Motors Corporation, Detroit, Mich., a corporation of Delaware Application January 16, 1936, Serial No. 59,358

8 Claims. (Cl. 62—108.5)

This invention relates to freezing trays adapted for use in household refrigerators.

An object of this invention is to provide a freezing tray having very simple but highly efficient means for loosening the frozen bond of the frozen ice blocks from the container pan without the aid of heat to facilitate the removal of the frozen contents.

A somewhat similar freezing device is disclosed in my pending application S. N. 688,715 filed September 9, 1933. In that application the cam-actuating hand lever is pivoted to the pan rather than to the grid. This present invention pivots the cam-actuating handle directly upon the grid and so associates the actuating cam and the coacting surface of the pan wall that the cam has at least a partial rolling motion upon said coacting surface of the pan wall, and hence the friction and wear between the cam and its coacting surface is greatly reduced and the operation of the entire device materially facilitated. To whatever extent the actuating cam surface moves in the same direction with the coacting surface of the pan, to that extent the relative sliding between these surfaces is reduced with a corresponding reduction in friction and wear and an increase in ease of operation.

Hence an important feature of this invention is the relative arrangement and association of the actuating cam and its coacting surface upon which it rides so that there occurs a partial relative rolling of these surfaces upon each other or at least a greatly reduced degree of relative sliding upon each other, whereby friction and wear is greatly reduced and the operation of the device materially facilitated.

Further objects and advantages of the present invention will be apparent from the following description, reference being had to the accompanying drawing wherein a preferred embodiment of the present invention is clearly shown.

In the drawing,

Fig. 1 is a plan view of a freezing tray made according to this invention.

Fig. 2 is a section on line 2—2 of Fig. 1 and shows the parts in normal freezing position.

Fig. 3 is an end elevation of the handle end of the tray.

Fig. 4 is a section on line 4—4 of Fig. 2.

Fig. 5 is a section similar to Fig. 2, but shows the handle raised to a position where the grid and ice have been pried loose from the container pan and may be lifted entirely therefrom by a further lifting up on the now horizontally disposed handle.

Similar reference characters refer to similar parts throughout the several views.

10 designates a somewhat thin and flexible sheet metal container pan which may be made from a flat metal sheet by a drawing operation in a manner well known. The side walls 11 of such a pan are flexible or distortable to some extent, that is, these side walls 11 may be quite easily bulged outwardly a small amount by an outward force applied to a side wall near its upper edge. The device of this invention utilizes to a great advantage this well-known flexing capacity of the side walls of such a tray.

The partitioning device chosen for illustration in the drawing is a molded flexible rubber grid 15 having a central longitudinal partition 16 and a series of transverse partitions 17 integral therewith. Central partition wall 16 has an open-bottom molded groove 18 at its bottom edge as best shown in Fig. 4. A metal bar or rod 20, preferably of stainless steel, fits snugly in this groove 18 and rests upon the bottom wall of pan 10 when in normal position therein (see Fig. 4). At the front of the tray the bar 20 curves upwardly and has a portion 21 projecting over the upper edge 22 of the front side wall 11. It is thus seen that the flexible rubber grid 15 overlies and fits snugly upon the relatively stiff metal bar 20 and will be lifted up when bar 20 is forced upwardly. Of course if desired, bar 20 may be cemented or otherwise bonded in place to the rubber grid or fixed thereto at its end portions in any other convenient manner so that these parts will not fall apart while handling same.

A hand lever 30 is pivoted upon the projection 21 of bar 20 at the pivot pin 31. Rigid with lever 30 and preferably made integral therewith is the actuating cam 32 whose cam surface 33 is so shaped and relatively arranged with its coacting surface 34 on the pan wall 11 that when handle 30 is rotated in the direction of the arrow in Fig. 2 cam surface 33 will at first have a pure or nearly pure rolling motion upon its coacting surface 34 and thereafter have more of a relative sliding motion thereupon, as will be clear from viewing Fig. 2. During this initial rolling motion of cam surface 33 upon its surface 34, the front pan wall 11 is moved outwardly by distortion thereof, this outward flexing taking place progressively from the upper edge of wall 11 to its bottom, and thus wall 11 is initially acted upon and progressively peeled from the frozen contents of the pan. Cam 33 then begins to act more in a downward direction upon its coacting surface 34 with a corresponding upward reaction upon end 21 of bar 20. This results in a progressive peeling of bar 20 together with the frozen contents from pan 10, this peeling obviously progressing from the front of the tray to the rear thereof. During this time the upward force of the operator's hand on lever 30 has reached such a vertical direction that it clearly aids the upward reactive force of cam 33 in forcing the grid and ice contents upwardly out of the pan 10. When handle 30 reaches the horizontal position shown in Fig. 5 its surface 35 abuts the top of projection 21, which serves as a stop to its pivotal movement about pin 31. Thereafter handle 30 serves as an extension to portion 21 of bar 20 and any upward pull on handle 30 after it reaches this stop position has a greatly increased leverage to lift the front end of bar 20 together with its rubber grid 15 and the frozen contents entirely out of pan 10. This is another important feature of applicant's invention. It is thus seen that hand lever 30 provides three important functions, namely: (1) it serves as a handle for pulling the tray out of its freezing compartment in the refrigerator; (2) it serves to actuate cam 33 to loosen grid 15 and the frozen contents from pan 10 as above described; (3) it serves after it reaches its stop position of Fig. 5 as a longitudinal extension to bar 20 to greatly facilitate the final prying loose of the grid and ice contents as a unit from pan 10 if by chance the rear portions of the grid and ice contents still remain at this time partially stuck to the pan 10. It is to be noted that hand lever 30 may perform functions (1) and (2) above simultaneously, that is to say, the actuation of cam 33 may occur before or while the tray is being pulled from its freezing compartment, which of course will facilitate the removal of pan 10 from its compartment since pan 10 can be more readily distorted to free its possible frozen bond to its support after its ice contents are loosened from the inside surface of the pan.

A further feature of this invention is the cutting away of the usual stiffening peripheral flange 40 around the upper edge of pan 10 at the corners of the pan, as clearly shown in Fig. 1 at 41. The cutting away of these corners at the front end of the pan 10 increases the outward distortability of the front wall 11 when acted upon by the cam 33 as above described and hence facilitates the peeling of this front wall 11 from the ice contents. The cutting away of these corners at the rear end of the tray similarly increases the distortability of the rear wall 11 and so facilitates the loosening of the two rearmost ice blocks therefrom. However it is not necessary for the operation of the device for these corners to be so cut away. A further feature of this invention is the steel wear plate 50 which provides a relatively hard wearing surface for the above-described co-acting surface 34 for the cam 33. Wear plate 50 is preferably a small stainless steel plate curved to conform to the rolled flange 22 and rigidly fixed thereto by small integral tongues 51 which extend thru small holes in and around the outer edge of flange 22 and are firmly crimped thereupon on the opposite side (see Figs. 4 and 5). By the use of this relatively hard wear plate 50 against which cam 33 rides the pan 10 may be made from any desired easy drawing and non-corroding metal such as aluminum or aluminum alloys, copper, or other relatively soft metal which would not normally be capable of withstanding the pressure and wear of cam 33 for a very long life. By the use of this simple and efficient separate wear plate 50 pan 10 may be made from the most suitable metal without regard to its capability of withstanding the pressure and wear of cam 33, and hence the cost of the device is materially reduced and its efficiency increased.

It is to be noted that the small wear plate 50 thus attached has substantially no stiffening effect on the outward bulging of the flexible front wall 11 as described above, and hence does not have an adverse effect upon the ease of operation of the device. The absence of a front handle attached to the front wall 11 of pan 10 also has this same beneficial effect. The result attained is to permit the front wall 11 to be peeled substantially free from the ice contents by the cam 33 before the main upward force is applied to bar 20 to peel the ice contents from the remainder of pan 10.

While the embodiment of the present invention as herein disclosed, constitutes a preferred form, it is to be understood that other forms might be adopted, all coming within the scope of the claims which follow.

What is claimed is as follows:

1. A portable freezing tray for use in household refrigerators, comprising: a container pan having an outwardly distortable side wall, a movable partitioning grid within said pan having a portion normally located adjacent the upper edge of said distortable wall, a cam pivotally mounted upon said portion and engageable with the upper edge of said distortable wall to force said wall outwardly and downwardly relative to said grid upon rotation of said cam, said cam and the coacting surface of said distortable wall being so relatively disposed that the outward and downward movement of said coacting surface is caused by a partial rolling movement of said cam thereupon, and a handle lever for actuating said cam, said lever depending downwardly outside of said wall.

2. A portable freezing tray for use in household refrigerators, comprising: a container pan having an outwardly distortable side wall, a movable partitioning grid within said pan having a portion normally located adjacent the upper edge of said distortable wall, a hand lever pivotally mounted upon said portion and depending downwardly outside of said tray and serving as a handle therefor, and a cam on said lever actuated when said depending lever is raised to engage said distortable wall and force same outwardly and downwardly.

3. A portable freezing tray, comprising: a container pan, a movable partitioning grid within said pan having a portion extending adjacent the upper edge of one of the side walls of said pan, a hand lever pivotally mounted upon said portion and depending downwardly outside of said pan and serving as a handle therefor, and means actuated when said lever is raised to force said wall outwardly and downwardly relative to said grid.

4. A portable freezing tray, comprising: a container pan, a movable partitioning grid within said pan having a portion extending adjacent the upper edge of one of the side walls of said pan, a hand lever pivotally mounted upon said portion and depending downwardly outside of said pan and serving as a handle therefor, and means actuated by the raising of said lever to at first primarily act to peel said front wall outwardly from the frozen contents of said pan and thereafter primarily act to lift said grid upwardly from said pan.

5. A portable freezing tray, comprising: a container pan, a movable partitioning grid within said pan having a portion extending adjacent the upper edge of one of the side walls of said pan, a hand lever pivotally mounted upon said portion and normally depending downwardly therefrom outside of said pan, and cam means actuated by the upward swinging of said lever to urge said side wall outwardly and downwardly relative to said grid and ice contents.

6. A portable freezing tray, comprising: a container pan, a movable partitioning grid within said pan having a portion extending adjacent the upper edge of one of the side walls of said pan, a hand lever pivotally mounted upon said portion and normally depending downwardly therefrom outside of said pan, and cam means actuated by the upward swinging of said lever to urge said side wall outwardly and downwardly relative to said grid and ice contents, and a stop for limiting the upward swinging of said lever relative to said grid portion after said lever has swung thru a substantial angle, whereby further upward force upon said lever is applied directly to urge said grid upwardly from said pan.

7. A freezing tray comprising: a container pan having an outwardly flexible wall, a mechanically ejected partitioning grid within said pan having a portion directly overlying the upper edge of said flexible wall, a rotatable cam pivoted upon said overlying portion on a center overlying the upper edge of said flexible wall and having its sub-pivot cam surface normally contacting the upper edge of said flexible wall, and force-multiplying means for rotating said cam in such direction that said cam surface initially moves along with said upper edge of the flexible wall in an outward direction from the pan interior.

8. A freezing tray comprising: a container pan having an outwardly flexible wall, a mechanically ejected partitioning grid within said pan having a portion projecting above the upper edge of said flexible wall, a rotatable cam pivoted upon said projecting portion on a center overlying the upper edge of said flexible wall and having its cam surface located above and engageable with the underlying upper edge of said flexible wall, and force-multiplying means for rotating said cam about said pivot center in a counter-clockwise direction when the pan is viewed in side elevation with said flexible wall at the right.

HARVEY D. GEYER.